US007967238B2

(12) United States Patent
Fuchs et al.

(10) Patent No.: US 7,967,238 B2
(45) Date of Patent: Jun. 28, 2011

(54) COMPOSITE AIR VEHICLE HAVING A HEAVIER-THAN-AIR VEHICLE TETHERED TO A LIGHTER-THAN-AIR VEHICLE

(75) Inventors: Ronald P. Fuchs, Bellevue, WA (US); Daniel J. Gadler, Mercer Island, WA (US); Rodney B. Kendrick, Bellevue, WA (US); John L. McIver, Bothell, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 11/470,126

(22) Filed: Sep. 5, 2006

(65) Prior Publication Data

US 2009/0302149 A1 Dec. 10, 2009

(51) Int. Cl.
*B64C 37/02* (2006.01)
(52) U.S. Cl. .......................................................... 244/2
(58) Field of Classification Search ................... 244/2, 3, 244/1 TD, 1 R
See application file for complete search history.

(56) References Cited

U.S. PATENT DOCUMENTS

| 2,879,016 | A | * | 3/1959 | Haase .................. 244/135 A |
| 3,008,665 | A | * | 11/1961 | Piasecki ........................ 244/2 |
| 3,091,419 | A | * | 5/1963 | Mosher .................. 244/135 A |
| 3,176,327 | A | * | 4/1965 | Oberth ............................ 441/83 |
| 3,807,661 | A | * | 4/1974 | Ikeda .............................. 244/5 |
| 3,976,265 | A | * | 8/1976 | Doolittle ......................... 244/2 |
| 4,482,110 | A | * | 11/1984 | Crimmins, Jr. ................ 244/26 |
| 4,695,012 | A | * | 9/1987 | Lindenbaum .................. 244/26 |
| 4,757,959 | A | * | 7/1988 | Schroder et al. ................ 244/2 |
| 4,889,297 | A | * | 12/1989 | Ikeda .............................. 244/5 |
| 5,074,489 | A | * | 12/1991 | Gamzon ........................ 244/2 |
| 5,082,205 | A | * | 1/1992 | Caufman ...................... 244/25 |
| 5,186,414 | A | * | 2/1993 | Holzschuh et al. ......... 244/3.12 |
| 5,356,097 | A | * | 10/1994 | Chalupa ....................... 244/139 |
| 6,142,414 | A | * | 11/2000 | Doolittle ....................... 244/25 |
| 6,224,015 | B1 | * | 5/2001 | Reinhard ...................... 244/24 |
| 6,422,506 | B1 | * | 7/2002 | Colby ....................... 244/1 TD |
| 6,926,049 | B1 | * | 8/2005 | Enig et al. ..................... 141/387 |
| 2004/0232285 | A1 | * | 11/2004 | Akahori ....................... 244/190 |
| 2005/0017129 | A1 | * | 1/2005 | McDonnell ............... 244/110 G |
| 2005/0284147 | A1 | * | 12/2005 | Allen et al. .................. 60/641.8 |

FOREIGN PATENT DOCUMENTS

WO WO 2004106156 A1 * 12/2004

* cited by examiner

*Primary Examiner* — Timothy D Collins
*Assistant Examiner* — Valentina Xavier
(74) *Attorney, Agent, or Firm* — Yee & Associates, P.C.; James M. Poole

(57) ABSTRACT

A system including a heavier-than-air vehicle (HTA), a lighter-than-air vehicle (LTA), and a tether is disclosed. The tether is coupled between the HTA and the LTA such that the LTA supports the HTA. The system may be further configured to suit the needs of the particular application. For example, the system may be configured to be controllable from a remote location or capable of autonomous operations. The system may also be configured such that the HTA comprises a mission payload and communications equipment. In an exemplary embodiment of the invention, the LTA is configured to provide lift for the system and the HTA is configured to provide station-keeping propulsion, the advantage being reduced fuel consumption and increased mission endurance.

23 Claims, 7 Drawing Sheets

COMPOSITE AIR VEHICLE HAVING A HEAVIER-THAN-AIR VEHICLE TETHERED TO A LIGHTER-THAN-AIR VEHICLE

TECHNICAL FIELD

Embodiments of the present invention relate generally to composite air vehicles. More particularly, embodiments of the present invention relate to a composite air vehicle system comprising a heavier-than-air vehicle (HTA), a lighter-than-air vehicle (LTA), and a tether coupled between the HTA and the LTA such that the LTA supports the HTA.

BACKGROUND

There is a current need for an airborne vehicle capable of performing surveillance, reconnaissance, communications, weapons delivery, or other missions, which can remain aloft for long periods of time. Because HTAs require propulsion to stay aloft, their endurance is limited by their fuel capacity and payload. The High Altitude Long Endurance (HALE) aircraft community has focused considerable effort over the past twenty years on designs to extend vehicle endurance up to one or two days, with future advanced concept designs targeting four to five days. However, airborne Intelligence, Surveillance, and Reconnaissance (ISR) mission requirements have lasted much longer than four to five days, as evidenced in recent theatres of conflict and other applications. Additionally, other missions such as communications relay, electronic warfare, and weapons delivery may also involve extended duration mission requirements. Furthermore, operational costs of carrying out these missions vary inversely as a function of aircraft endurance.

On the other hand, LTAs often have adequate endurance and ample payload capacity but lack the propulsion and energy means required to keep a large LTA in one location, given the winds at high altitude. Additionally, LTAs are limited by materials technology. For example, ultraviolet radiation causes degradation at high altitude over periods of time. LTAs are further limited by operational constraints on takeoff and landing as well as survivability in military environments.

BRIEF SUMMARY

An HTA and an LTA can be coupled together in order to utilize the positive characteristics of each while mitigating the negative factors. By coupling an HTA and an LTA using a tether such that the LTA supports the HTA, the system described herein can benefit from the lift provided by the LTA. At the same time, the system can exploit the station-keeping propulsion provided by the HTA. Such a system is desirable because the HTA can conserve fuel and remain aloft in one location for greater periods of time. The LTA can be simple, inexpensive, and expendable. Additionally, the system described herein can utilize currently available HTAs and LTAs with relatively minor design modifications.

The above and other aspects of the invention may be carried out in one embodiment by a system comprising an HTA, an LTA, and a tether coupled between the HTA and the LTA such that the LTA can support the HTA. The HTA may include a mission payload. Also, the system may further comprise remote control or data collection subsystems for remote or autonomous control.

Another embodiment is an LTA comprising a body having a lighter-than-air gas, an attachment mechanism, and a tether configured for supporting a heavier-than-air body and having an end configured for coupling to the attachment mechanism.

Another embodiment is an HTA comprising an aircraft having a propulsion system, an attachment mechanism defining at least one attachment location on the aircraft, and a tether configured for supporting the aircraft and having an end configured for coupling to the attachment mechanism.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1:
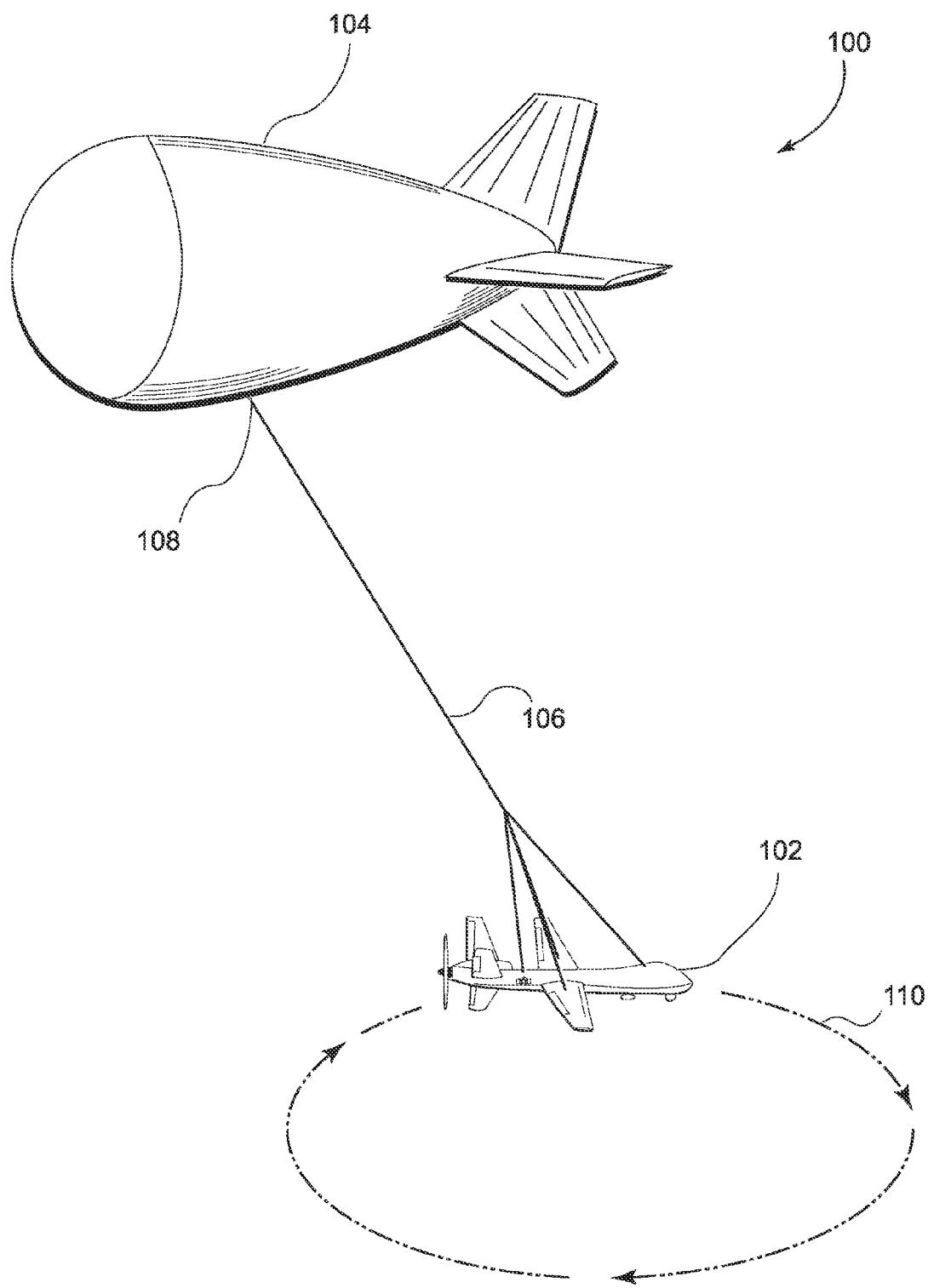
FIG. 1 is a diagram of a system of one embodiment comprising an HTA, an LTA, and a tether coupled between the HTA and the LTA.

FIG. 1 shows a system of one embodiment 100 comprising a heavier-than-air vehicle (HTA) 102, a lighter-than-air vehicle (LTA) 104, and a tether 106 coupled between the HTA 102 and the LTA 104. The tether 106 is configured such that the LTA 104 supports the HTA 102. In a preferred embodiment, the system 100 is configured to be launched from a fixed or mobile surface launch facility and rise to an operational altitude appropriate for the mission and vehicle combination.

The HTA 102 has a propulsion system which can be used to provide station-keeping for the system 100, and which can be used for other maneuvering of the HTA and/or the LTA 104. In a preferred embodiment, the HTA 102 is an unmanned aerial vehicle (UAV) of a fixed wing design. A preferred embodiment of the HTA 102 also has a payload sufficient to carry equipment necessary for Intelligence, Surveillance, and Reconnaissance (ISR) or other missions. One embodiment of the HTA 102 may be realized as an ALTAIR aircraft manufactured by GENERAL ATOMICS. The ALTAIR craft has adequate payload to carry the PREDATOR mission payload and the ALTAIR craft is powered by a 700 horsepower turboprop engine. In practice, the propulsion system of the HTA 102 may utilize other technologies such as, without limitation: jet engines; piston-powered propellers; hybrid gas/electric propulsion; or electric propulsion. Additionally, the ALTAIR craft is approximately 11 meters in length and has a mass of approximately 3200 kilograms. Another embodiment of the HTA 102 may be realized as an ALTUS II craft, also manufactured by GENERAL ATOMICS. The ALTUS II craft is approximately 7.3 meters in length and has a mass of approximately 725 kilograms. An embodiment of the HTA 102 may also include some modification of the ALTAIR or ALTUS II, such as increasing the propeller diameter or adding additional propeller blades.

The LTA 104 may be a balloon, a bag, a blimp, an aerostat, a shell, or any suitable component having virtually any suitable shape that is filled with a lighter-than-air gas, such as helium or hydrogen. A preferred embodiment of the LTA 104 is realized as an aerostat having aerodynamic characteristics (shape, configuration, and/or other features that provide aerodynamic qualities). The LTA 104 relies on buoyancy for lift, not on dynamic lift. In a preferred embodiment, the LTA 104 is a low-cost, unpowered, unmanned, disposable component which provides lift for the system 100. The LTA 104 may have a diameter (at its widest point) in the range of approximately 15 to 36 meters. The specific size, shape, and configuration of the LTA 104 will be dictated by the mass of the HTA, required operational altitude, cost constraints, weight restrictions, visibility considerations, stability considerations, and other practical conditions. The LTA 104 is configured for coupling to the tether 106 at attachment location 108. Although a single attachment location 108 may be utilized as depicted in FIG. 1, an embodiment of the LTA 104 may include multiple attachment locations 108 for a tether 106 having a plurality of coupling features.

A preferred embodiment of the tether 106 will have a first end configured for coupling to the attachment mechanism of the LTA 104 and a second end configured for coupling to the HTA 102. In this example, the tether 106 is "dumb" because it does not carry power or communications. Rather, the tether 106 is primarily utilized as a load-bearing component; the tether 106 may be configured to support the selected HTA vehicle. Of course, the load rating of the tether 106 may be selected to accommodate the weight of the HTA 102 and to accommodate anticipated dynamic forces caused by environmental conditions, equipment located on the HTA 102, and/or propulsion of the HTA 102. In practice, the tether 106 can be inexpensive and lightweight compared to traditional ground-anchored tethers. The tether 106 may be formed from any appropriate material having the desired physical properties and load rating. For example, tether 106 may be formed from a flexible, high-strength, low-density material such as Zylon or Kevlar polymer products, or the like. In another embodiment, the tether 106 may be rigid or partially rigid. A length of the tether 106 may be within a wide range, depending on mission goals. A length of the tether between the HTA 102 and the LTA 104 may have a wide range, depending on mission goals. In one embodiment, the tether is less than 500 feet. However, embodiments with very short (e.g., a few feet) or very long (e.g., 20,000 feet) do not depart from the scope of this invention. Also, the length of the tether 106 may be changeable during system operation, such as with the use of a reel to bring the HTA and LTA closer together, farther apart, or into contact with each other. A thickness of the tether is selected to provide the desired load rating for supporting the HTA 102 and for towing the LTA 104 against wind forces.

Figure 5:
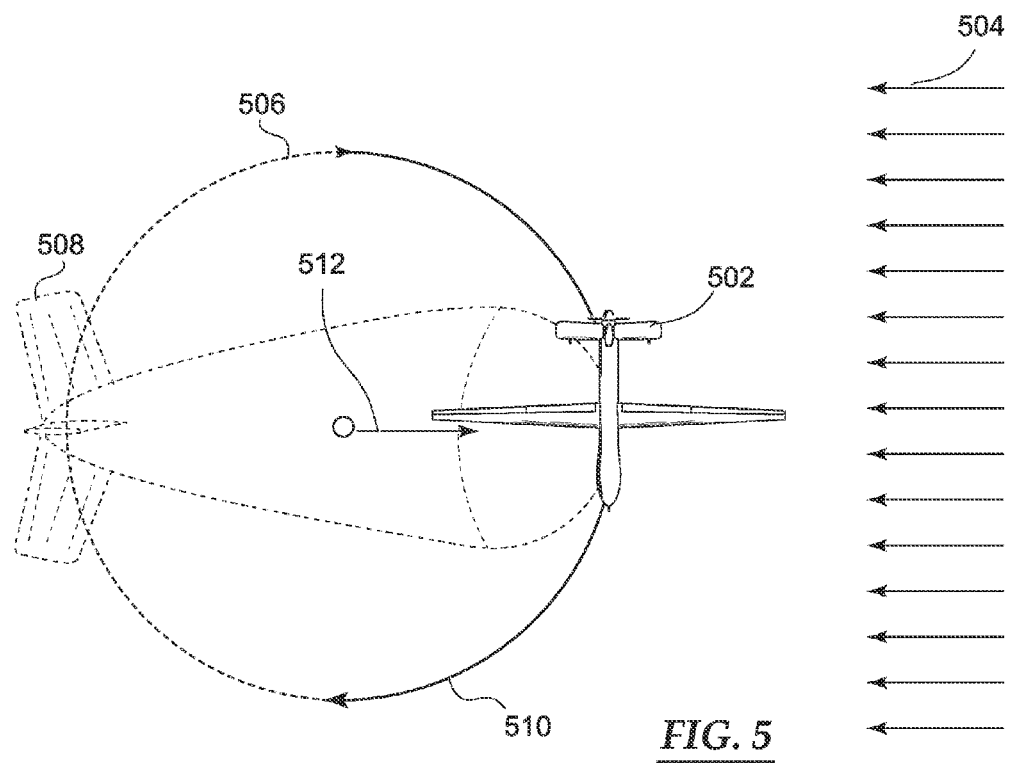
FIG. 5 is a top-view diagram showing thrust applied by an HTA to provide station-keeping against opposing forces.
Figure 6:
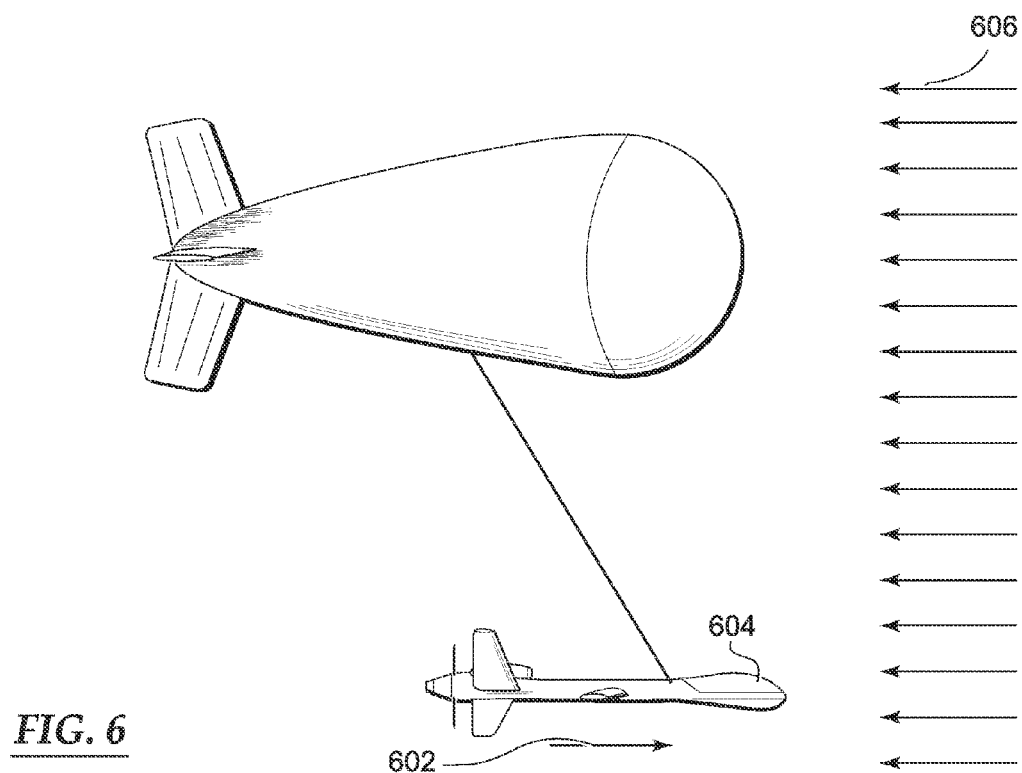
FIG. 6 is a side-view diagram showing thrust applied by an HTA to provide station-keeping against opposing forces, the HTA flying in a substantially straight path.

In a preferred embodiment of the system 100, the propulsion system on the HTA 102 can be throttled to produce a force in order to provide station-keeping for the system 100. As used herein, the term "station-keeping" refers to maneuvers that maintain the system 100 within a specified area relative to a designated reference position. For example, the station-keeping area or distance for the system 100 may correspond to a range of up to 20,000 meters away from the reference location, depending on mission application. The actual station-keeping distance may vary from one deployment to another. FIG. 1 shows the HTA 102 flying in a path 110 defined by the attachment location 108 and the tether 106. FIG. 1 depicts a substantially circular path 110. However, the path 110 can be of any trajectory, size, or shape, including a substantially straight one. In practice, the path 110 may be dependent on opposing forces such as wind, as the HTA 102 provides station-keeping for the system 100. Two possible flight paths 110 for the HTA 102 are illustrated in FIGS. 5 and 6 and are described in more detail below. Alternatively, the HTA 102 may simply hang suspended at the end of the tether 106. If the HTA 102 is equipped with a propulsion system having restart capability, the propulsion system can be shut down in order to conserve fuel (assuming the environmental conditions allow such operation).

Figure 2:
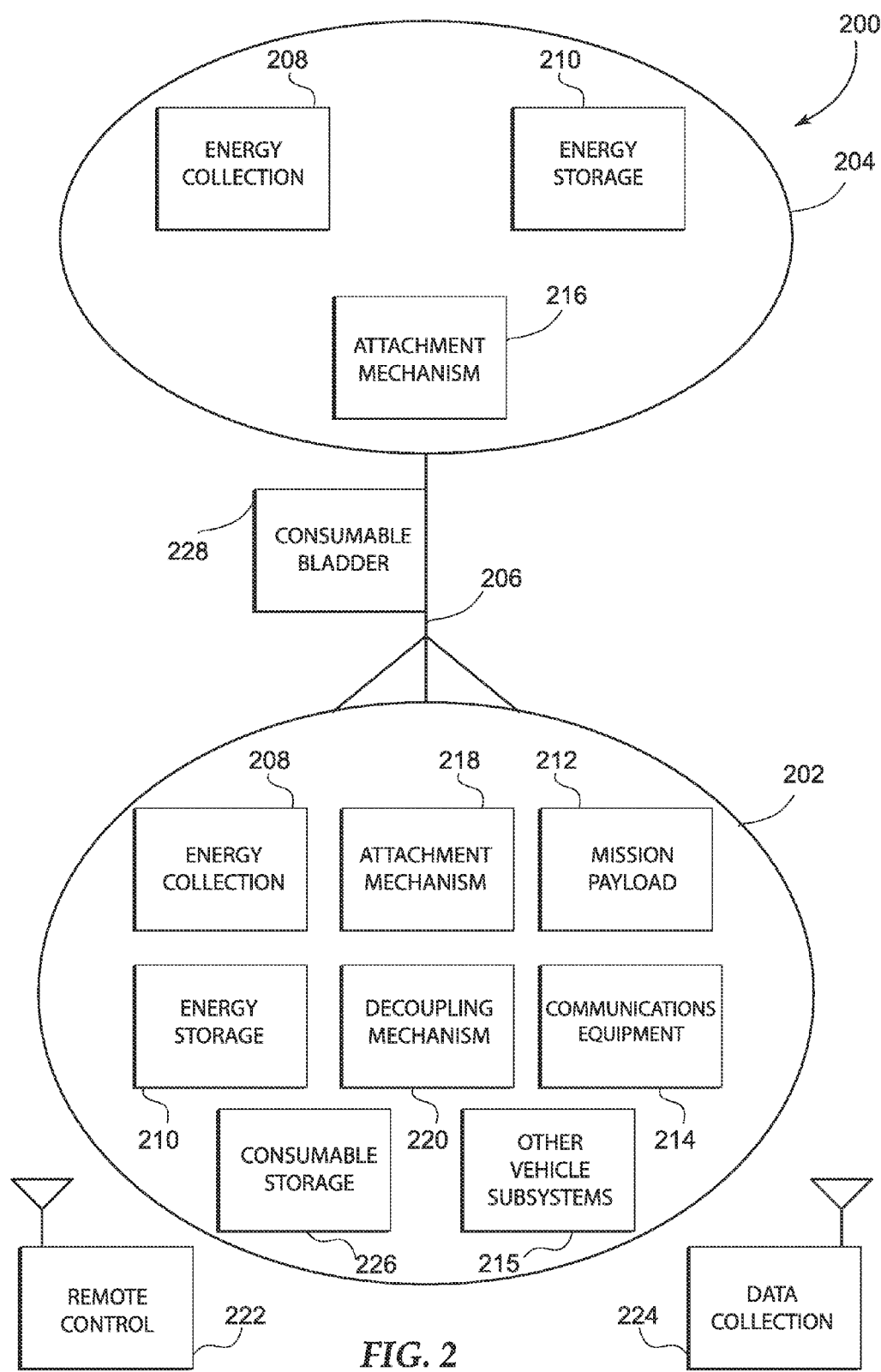
FIG. 2 is a block diagram of a composite HTA/LTA system configured in accordance with an embodiment of the invention.

FIG. 2 shows a block diagram of a system 200, similar to that described above, but further comprising various equipment and subsystems. In this regard, the system 200 generally includes an HTA 202, an LTA 204, and a tether 206. An embodiment of the system 200 may have any combination of the equipment and subsystems shown in FIG. 2, including all or none of them, as well as the standard vehicle systems and subsystems.

One embodiment of the system 200 may include an energy collection subsystem 208. The energy collection subsystem 208 may be comprised of solar panels, low-cost solar cells, or any suitable energy collection device, mechanism, or apparatus, and may be located on the HTA 202 and/or the LTA 204. For example, the energy collection subsystem 208 may utilize solar cells on the outer surface of the HTA 202 and/or the LTA 204. A preferred embodiment of system 200 does not include an energy collection subsystem 208 at the LTA 204 because the LTA 204 is designed to be passive, inexpensive, and expendable. The system 200 might also have a suitably configured energy storage subsystem 210, located on the HTA 202 and/or the LTA 204; the energy storage subsystem 210 may cooperate with the energy collection subsystem 208 to serve as a power source for the system 200. A preferred embodiment of system 200 does not include an energy storage subsystem 210 at the LTA 204 because the LTA 204 is designed to be passive, inexpensive, and expendable. Accordingly, either an energy collection subsystem 208 or an energy storage subsystem 210 would be an enhancement and is not required for an HTA-LTA system, such as the system described above in conjunction with FIG. 1, to fulfill its mission.

Also depicted in FIG. 2 are mission payload 212 and communications equipment 214. The mission payload 212 may be surveillance, reconnaissance, communications, weather sensors, electronic warfare, weapons, or other subsystem(s). In addition to the mission payload 212, the HTA 202 may carry other sensors dedicated to supporting remote control and/or autonomous operations of the HTA 202. Moreover, the HTA 202 may also comprise communications equipment 214 that is configured to establish data communication with one or more devices or subsystems external (or internal) to the HTA 202. For example, the communications equipment 214 may be realized as a wireless data communication system that uses any suitable data transmission or protocol. In practice, the HTA 202 may also carry other vehicle subsystems as needed.

FIG. 2 shows an attachment mechanism 216 on the LTA 204 for coupling the tether 206 to the LTA 204. The attachment mechanism 216 for the LTA 204 may be a swiveling fixture on the bottom of the LTA 204, such as a ball joint.

Alternatively, the attachment mechanism may be a u-joint, gimbal, or other mechanism. Furthermore, an embodiment of the LTA 204 may utilize multiple attachment mechanisms 216 for a tether having a plurality of coupling features. Similarly, as shown in FIG. 2, the HTA 202 has an attachment mechanism 218. In a preferred embodiment of the HTA 202, the attachment mechanism 218 will couple the tether 206 to one or a plurality of attachment locations on the HTA 202.

One advantage of the composite HTA/LTA system is that at mission completion, when the LTA is no longer needed to provide or maintain lift for the system, the LTA can be jettisoned. Thus by carrying any costly equipment on the HTA and recovering the HTA at mission completion, the LTA can be made in the least costly manner possible. The HTA could be recovered by allowing it to return under its own power either remotely or autonomously controlled. If desired, the LTA could also be recovered, either apart from or with the HTA. In this regard, FIG. 2 indicates a decoupling mechanism 220 on the HTA 202 for separating the HTA 202 and the LTA 204. One possible embodiment of the decoupling mechanism 220 is a guillotine-type mechanism that severs the tether 206 as needed. Alternatively, the decoupling mechanism 220 may be realized as any of the following, without limitation: a pyrotechnic device; a solenoid-initiated quick release device; or a wide variety of other detachment mechanisms.

FIG. 2 also shows two subsystems which are remote from the system 200. These two subsystems may be ground-based, aircraft-based, space-based, or otherwise, and in a preferred embodiment, will communicate with the HTA 202. One of the subsystems is a remote control subsystem 222. The remote control subsystem 222 may comprise components and logic for controlling adjustments in position, altitude, and attitude of the system 200. In particular, the remote control subsystem 222 may be configured to remotely control the operation of the HTA 202, including propulsion maneuvers, station-keeping maneuvers, and/or landing maneuvers. However, the system 200 may be configured to control itself autonomously and may not require a remote control subsystem 222. The other remote subsystem in this example is a data collection subsystem 224. The data collection subsystem 224 may include components and logic for sensing position, altitude, and attitude of the system 100. In practice, the data collection subsystem 224 and/or the remote control subsystem 222 may cooperate with the communications equipment 214 onboard the HTA 102 to support data transfer to the system 200.

FIG. 2 further shows a consumable storage subsystem 226 on the HTA 202 and a consumable bladder or other storage mechanism 228 on the tether 206. The consumable handled by these components may be, for example, fuel, coolant, lubricant, or hydraulic fluid for the HTA 202. Each of the consumable storage subsystems (226 and 228) are possible enhancements and are not required for an HTA-LTA system, such as the system described above in conjunction with FIG. 1, to fulfill its mission. The consumable storage subsystem 228 is described further below in conjunction with FIG. 4.

It should be appreciated that FIG. 2 depicts an embodiment of the system 200 that includes several optional features. In practice, the system 200 need not (and preferably will not) be deployed with all of features and components shown in FIG. 2. In this regard, a preferred embodiment of system 200 may utilize a fully passive, low-cost, and disposable LTA 204 that carries no energy collection subsystem, no energy storage subsystem, no communication equipment, etc. Of course, the preferred embodiment of LTA 204 will utilize some type of attachment mechanism 216 for the tether 206. Moreover, a preferred embodiment of the HTA 202 need not include the energy collection subsystem 208 or the energy storage subsystem 210. In certain deployments, the HTA 202 may only require the attachment mechanism 218 and the mission payload 212.

Figure 3:
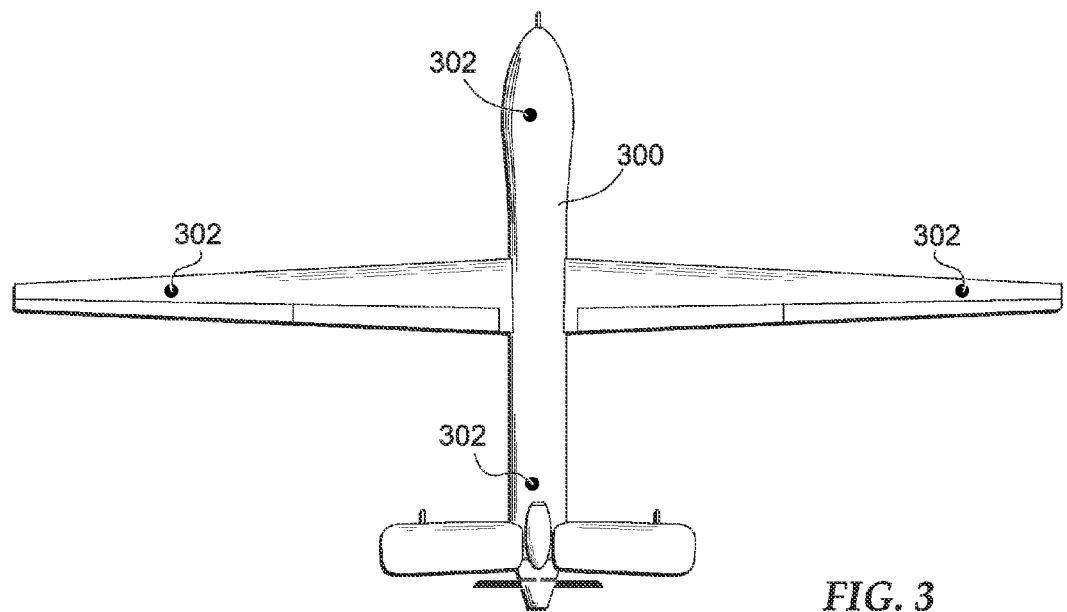
FIG. 3 is a top view of an HTA of one embodiment showing possible tether attachment locations.

FIG. 3 depicts a top view of an HTA 300, which may be configured as described above. FIG. 3 illustrates possible attachment locations 302 on the HTA 300 for an attachment mechanism coupled to a tether. The attachment mechanism may define one attachment location 302 on the HTA 300 or a plurality of attachment locations 302, as shown in FIG. 3. A compatible tether may include a plurality of coupling elements corresponding to these attachment mechanisms. In this example, the attachment locations 302 are arranged to provide stability for the HTA 300 during station-keeping maneuvers. In particular, the attachment locations 302 correspond to a fore location, and aft location, a left wing location, and a right wing location. The specific attachment locations may vary from that depicted in FIG. 3, depending upon the particular system deployment, the configuration of the HTA 300, and other practical considerations.

Figure 4:
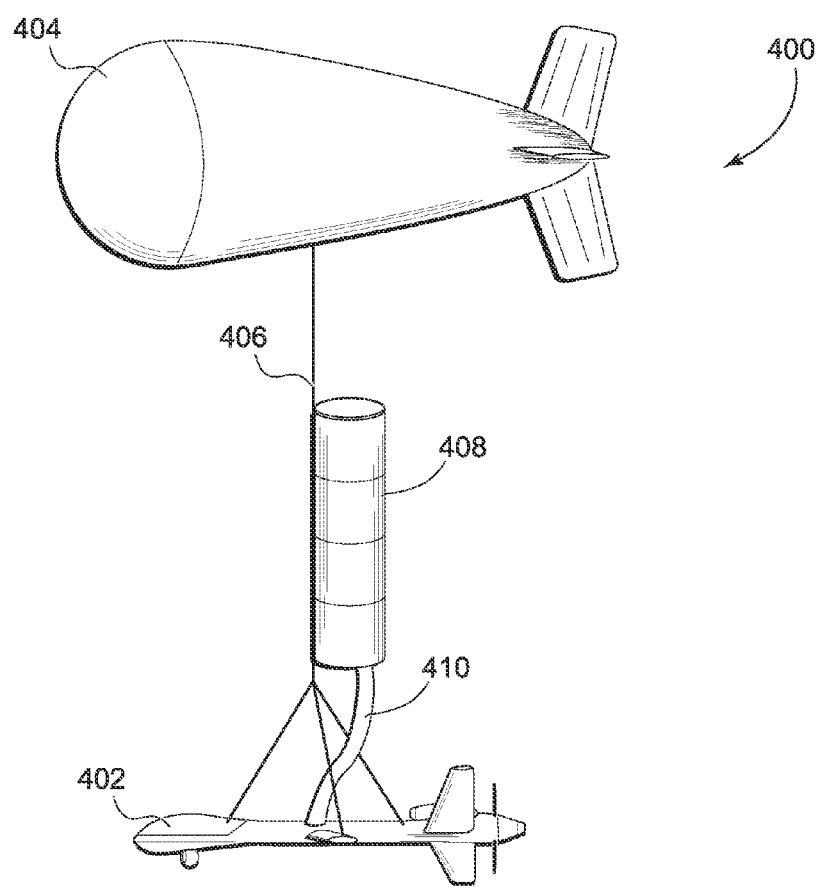
FIG. 4 is a side view of a composite HTA/LTA system of one embodiment having a bladder for storing a consumable for the HTA.

FIG. 4 shows a system 400 comprising an HTA 402, an LTA 404, a tether 406, and consumable storage 408 coupled to the tether 406. The consumable storage 408 coupled to the tether 406 may be an enhancement to an HTA-LTA system and is not required for an HTA-LTA system, such as the system described in conjunction with FIG. 1, to fulfill its mission. The consumable storage 408 may have an outlet 410 configured to deliver a consumable (or any substance) to the HTA 402. The outlet 410 can be designed to mate with a receptacle of the HTA 402. The consumable may, for example, be fuel, coolant, lubricant, or hydraulic fluid for the HTA 402. In one embodiment, the consumable is gravity-fed from a bladder 408 to the HTA 402. In such an embodiment, the bladder 408 is suitably configured to gravitationally deliver the consumable to the HTA 402. Also, the consumable storage 408 can be formed from a flexible material and can pressure feed the consumable through the outlet 410 to the HTA 402. A preferred embodiment of the system 400 would comprise a long, cylindrical bladder 408 attached to the tether 406 at a plurality of locations near the end of the tether 406 that is closest to the HTA 402. One embodiment of the outlet 410 may be a flexible fuel feed line from the bladder 408 to the HTA 402. As described above, the HTA 402 may include a consumable storage subsystem that receives the consumable delivered by the consumable storage 408 (see FIG. 2).

An HTA in a composite aircraft system as described herein may utilize its propulsion system to maintain the system within a desired station-keeping area. The methodology of how this is done depends on the type of station-keeping required and the forces such as winds causing the system to displace from its desired location. Since winds are perceived as the most disruptive force, the following analysis focuses on that factor, but other forces may be present. Two disparate mission requirements are possible. In one, the system is to maintain a placement in the sky to within a few hundred meters. In the other, the system could move around in a certain area (e.g., a "box" that is ten kilometers on a side). The station-keeping requirements will be different for these scenarios. In addition, there may be three types of disruptive winds: no wind, light wind, or high wind. Table 1 describes possible station-keeping regimes against different wind and location tolerances.

TABLE 1

Station-Keeping Operations Versus Mission Requirements and Winds

| | Station-Keeping Requirements | |
|---|---|---|
| Winds | Maintain close requirements within a one hundred meter box. | Allowable movement within a large box of approximately 10,000 meters on a side. |
| High Wind | The HTA points into the wind and holds the LTA against this force. There is enough airflow over the control surfaces to maintain control authority. | The HTA points into the wind and holds the LTA against this force. There is enough airflow over the control surfaces to maintain control authority. |
| Low Wind | The HTA flies in a circular pattern as prescribed by the tether. There are times when the LTA is blown back and other times when the LTA is pulled against the wind. The vehicle stays within its station-keeping box. The circular pattern keeps flow over the HTA's surfaces and maintains control authority. | The HTA hangs limply under the LTA and drifts back against the wind until it reaches its station-keeping boundary. Then, the engine throttles up, and the HTA pulls the LTA back against the wind to the other side of the box. The combination of wind and movement provides enough control flow over the wings. There it will throttle down and be slowly blown back by the wind to repeat the process. |
| No Wind | The HTA powers down and hangs beneath the LTA. | The HTA powers down and hangs beneath the LTA. |

Propulsion may be applied in a controlled manner to compensate for wind, turbulence, thermal currents, and other environmental conditions. In this regard, FIG. 5 is a top-view diagram that illustrates thrust applied by an HTA 502 to provide station-keeping against opposing forces 504 (such as wind). FIG. 5 depicts the HTA 502 flying in a path 506 that is substantially circular (or other closed figure). A substantially circular flight path 506 by the HTA 502 may be desirable in order to conserve fuel. A substantially elliptical or other flight path 110 by the HTA 102 may be similarly advantageous. In such a situation, thrust may be provided by the HTA 502 only during half of each rotation about the attachment mechanism on the LTA 508. The arrow 510 in FIG. 5 represents the flight path. Such a sequence of applying thrust can produce a net force 512 to provide station-keeping by countering opposing forces 504. Opposing forces 504 may be caused by wind or other factors.

FIG. 6 is a side-view diagram showing thrust 602 applied by an HTA 604 to provide station-keeping against opposing forces 606. This formation is used against the high wind scenario and in the power forward/drift back formation.

Feasibility Study

The low wind/tight station-keeping scenario presents the requirement of maintaining control within a constrained area. In that case, the HTA is required to fly in tight circles, pulling the LTA against the wind force and maintaining enough airflow over the control surfaces. The forces involved can be complicated, but they all must balance to ensure that the HTA/LTA system remains within its required airspace.

Figure 7:
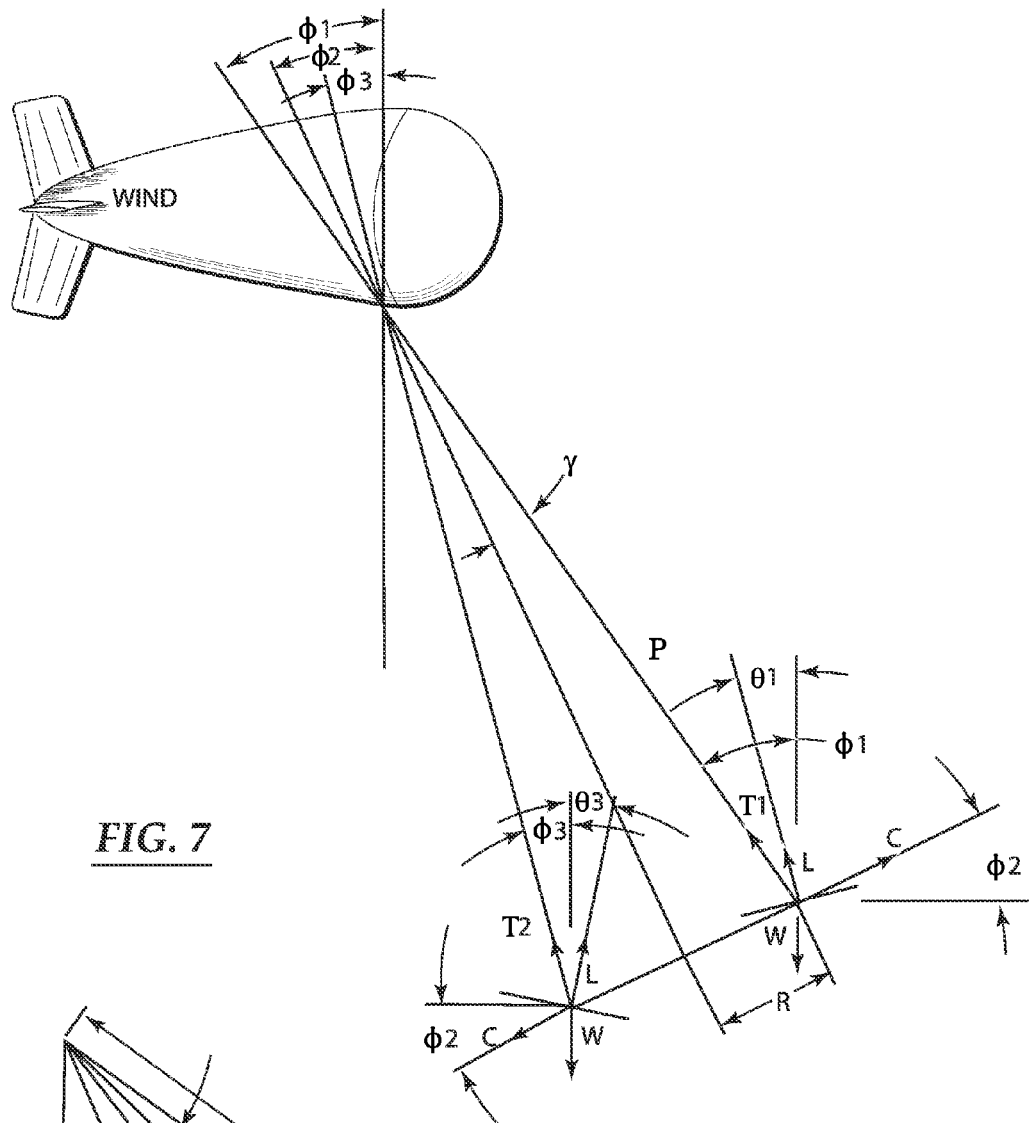
FIGS. 7-11 are diagrams related to a feasibility study for a composite HTA/LTA vehicle.

A composite HTA/LTA vehicle can be deployed as a practical working embodiment, as demonstrated in this section, which refers to FIGS. 7-11. Referring to FIG. 7, assume that the system includes an aerostat with an aircraft hanging underneath it. The airplane is under power and flying in a tight circle. The airplane is maintaining a constant velocity of Vp (m/s). The length of the tether is defined by the symbol P (meters). The plane has a weight of W (Newtons) and a lift of L (Newtons). Since the plane is traveling around in a circle it has a centripetal motion of C (Newtons). The aircraft is also supported in part by the tether which has a tension T (Newtons).

Figure 8:
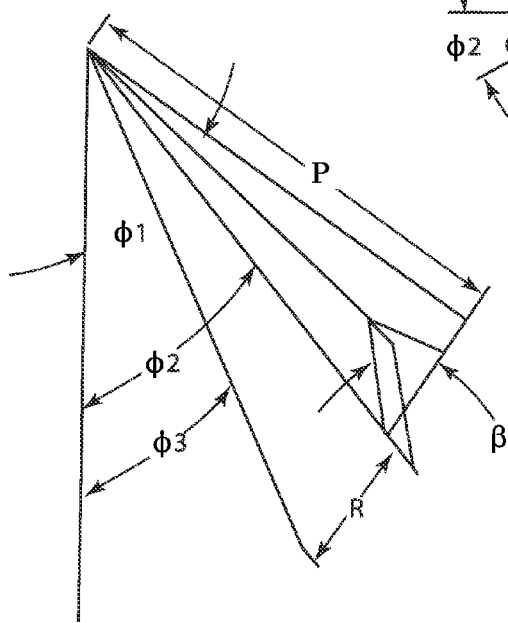

Referring to FIG. 8, the following relationships apply:

$$\phi_2 = \frac{\phi_3 + \phi_1}{2}$$

$R = P \sin(\phi_1 - \phi_2)$; R is the circular radius corresponding to the tethered flight path of the HTA.

The angle $\phi_2$ is defined as the angle from the vertical that defines the center of the circle that the aircraft is moving around. $\beta$ is the angle that defines the aircraft's path within the circle, and $\gamma$ is the angle that defines the angle away from the centerline. The following relationships apply:

Speed=Vp

Circle=$2\pi R = 2\pi P \sin(\phi_1 - \phi_2)$ $$\text{Time} = t = \text{Circle}/\text{Speed} = \frac{2\pi P \sin(\phi_1 - \phi_2)}{Vp};$$

this is the time required for the HTA to complete one rotation.

$$\beta = \omega t = \frac{Vp}{P \sin(\phi_1 - \phi_2)} t;$$

$\beta$ is the radial angle away from the LTA/HTA centerline.

$$0 \leq t \leq \frac{2\pi P \sin(\phi_1 - \phi_2)}{Vp}$$

$$\phi = \phi_2 + \arctan\left(\frac{R \cos\beta}{P \cos(\phi_1 - \phi_2)}\right)$$

$$= \phi_2 + \arctan\left(\frac{P \sin(\phi_1 - \phi_2)(\cos\beta)}{P \cos(\phi_1 - \phi_2)}\right)$$

$$\phi = \phi_2 + \arctan(\tan(\phi_1 - \phi_2)(\cos\beta))$$

$$\phi = \phi_2 + \arctan\left(\tan(\phi_1 - \phi_2)\left(\cos\frac{Vp}{P \sin(\phi_1 - \phi_2)} t\right)\right)$$

$$0 \le t \le \frac{2\pi P \sin(\phi_1 - \phi_2)}{Vp}$$

$$\gamma = \arcsin\frac{R}{P} = \arcsin\left(\frac{P\sin(\phi_1 - \phi_2)}{P}\right) = (\phi_1 - \phi_2)$$

Figure 9:
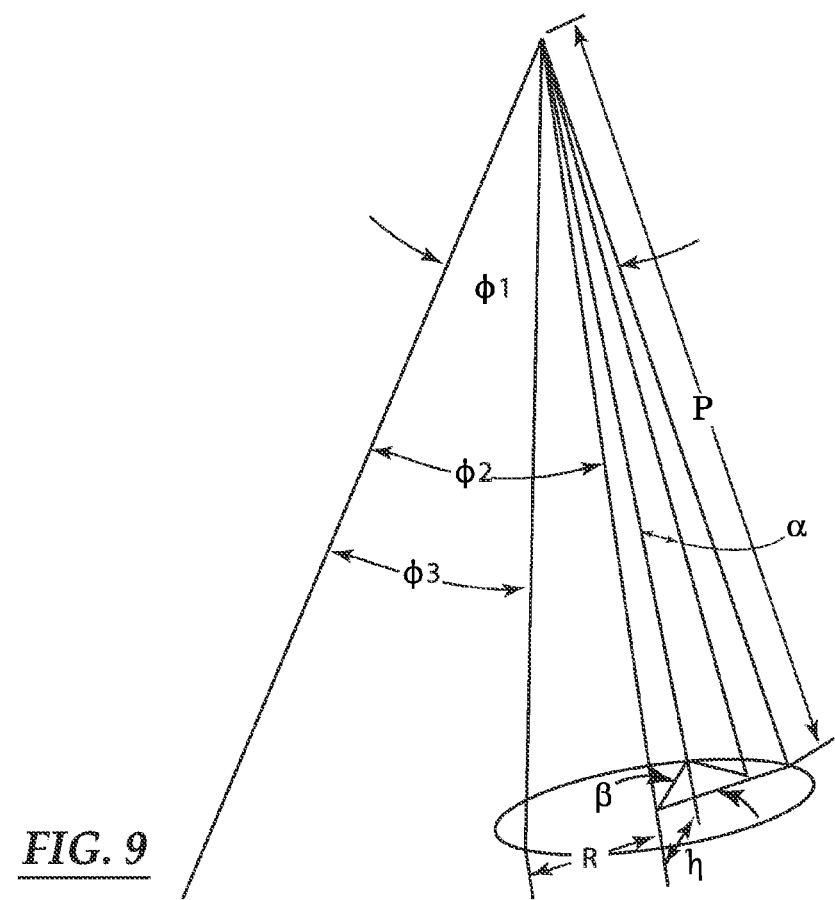

With reference also to FIG. 9, the following relationships apply:

$$\alpha = \arcsin\left(\frac{R\sin\beta}{P}\right)$$
$$= \arcsin\left(\frac{P\sin(\phi_1 - \phi_2)\sin\beta}{P}\right)$$
$$= \arcsin(\sin(\phi_1 - \phi_2)\sin\beta)$$

$$\beta = \omega t = \frac{Vp}{P\sin(\phi_1 - \phi_2)} t$$

$$\alpha = \arcsin\left(\sin(\phi_1 - \phi_2)\sin\left(\frac{Vp}{P\sin(\phi_1 - \phi_2)} t\right)\right)$$

$$0 \le t \le \frac{2\pi P \sin(\phi_1 - \phi_2)}{Vp}$$

Here, α defines the angle away from the x-y plane that the aircraft is making as it spins around the circle.

$$\sum F_x = 0$$
$$M_p \frac{d^2 x}{dt^2} + C\cos\phi\cos\beta - L\sin\theta\sin\phi\cos\alpha - T\sin\phi\cos\alpha = 0$$
$$\sum F_y = 0$$
$$M_p \frac{d^2 y}{dt^2} - M_p G + C\sin\phi\cos\beta + L\cos\theta\cos\phi\cos\alpha - T\cos\phi\cos\alpha = 0$$
$$\sum F_z = 0$$
$$M_p \frac{d^2 z}{dt^2} - C\cos\phi\sin\beta + L\sin\theta\sin\alpha + T\sin\phi\sin\alpha = 0$$

Figure 10:
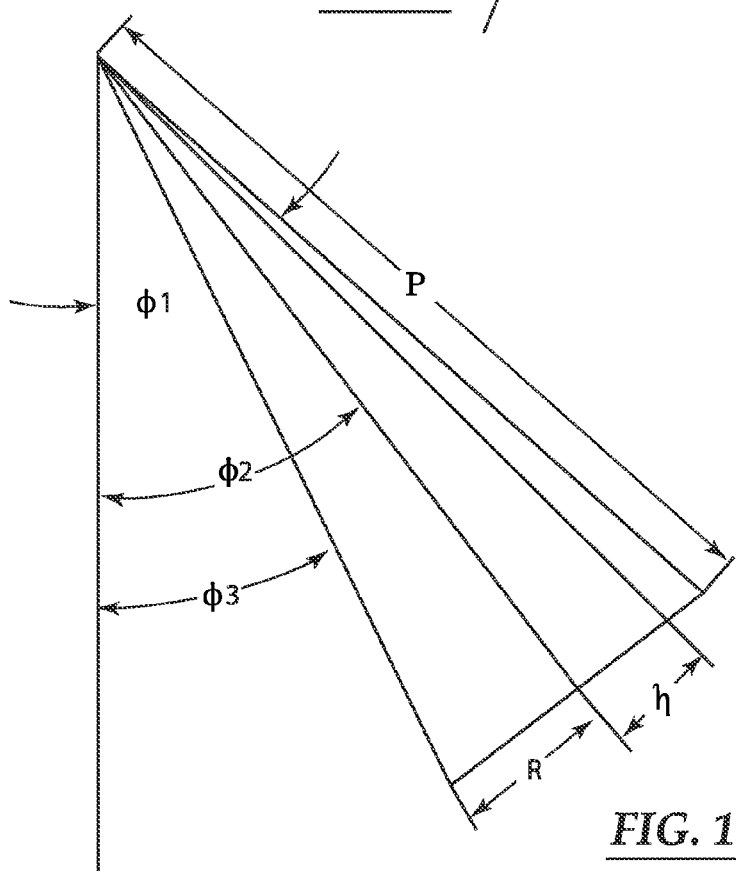

With reference also to FIG. 10, the following relationships apply:

$$C = \frac{V_p^2 W}{RG} = \frac{V_p^2 W}{P\sin(\phi_1 - \phi_2)G}$$

$$L = \frac{V_p^2 S \rho C_L}{2};$$

the coefficient of lift $C_L$ is a function of the bank angle that the aircraft makes as it spins around the circle.

Figure 11:
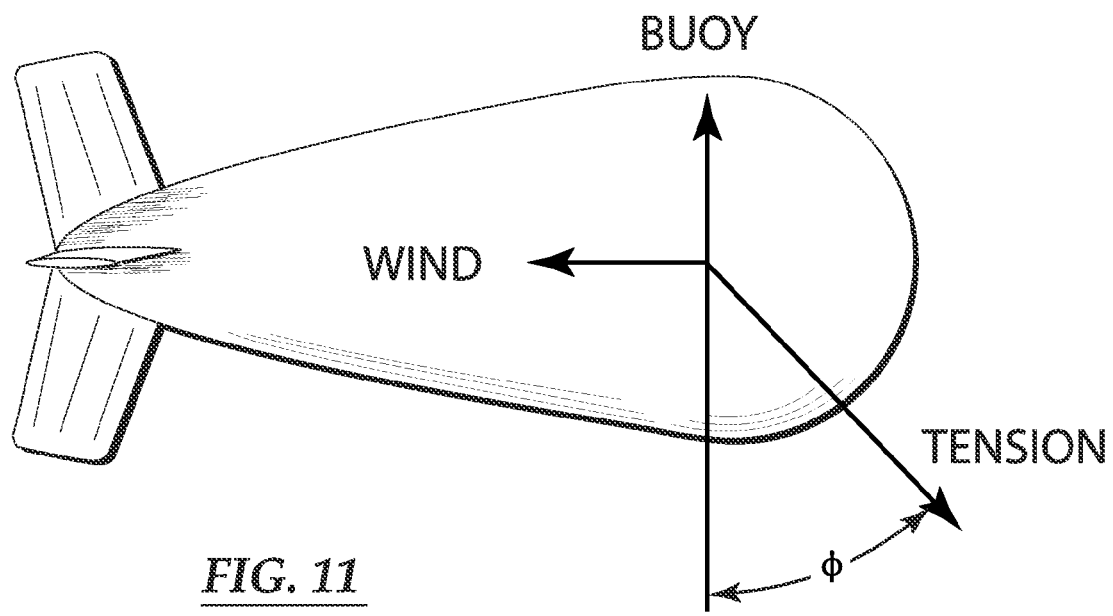

With reference to FIG. 11, at the aerostat, which jerks around as the plane circles, the following relationships apply:

$$\sum F_x = 0$$
$$M_b \frac{d^2 x}{dt^2} + T\sin\phi\cos\alpha - \text{Drag} = 0$$

$$M_b \frac{d^2 x}{dt^2} + T\sin\phi\cos\alpha - \frac{1}{2} C_D(\text{balloon}) A(\text{balloon}) \rho V_w^2 = 0$$

$$\sum F_y = 0$$
$$M_p \frac{d^2 y}{dt^2} + B - T\cos\phi\cos\alpha = 0$$
$$\sum F_z = 0$$
$$M_p \frac{d^2 z}{dt^2} + T\sin\phi\sin\alpha = 0$$

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A system comprising:
   a heavier-than-air vehicle having a propulsion system and mission payload;
   a lighter-than-air vehicle; and
   a tether coupled between the heavier-than-air vehicle and the lighter-than-air vehicle, wherein the tether is attached to the heavier-than-air vehicle at a first coupling and is attached to the lighter-than-air vehicle at a second coupling, wherein wings of the heavier-than-air vehicle when attached to the lighter-than-air vehicle are substantially horizontal, wherein the heavier-than-air vehicle is suspended below the lighter-than-air vehicle with respect to a direction of gravity, wherein the first coupling, the second coupling, and the tether allow the heavier-than-air vehicle to fly in a different flight path relative to the lighter-than-air vehicle, wherein the tether is configured such that the lighter-than-air vehicle can support the heavier-than-air vehicle while the heavier-than-air vehicle flies in motion relative to the lighter-than-air vehicle, and wherein the heavier-than-air vehicle remains supported by the lighter-than-air vehicle and functions as a unit with the lighter-than-air vehicle while using the mission payload.

2. A system according to claim 1, wherein the heavier-than-air vehicle is unmanned.

3. A system according to claim 1, wherein the lighter-than-air vehicle is a gas-filled aerostat.

4. A system according to claim 1, wherein the heavier-than-air vehicle is configured to provide station-keeping propulsion for the system.

5. A system according to claim 1, wherein the lighter-than-air vehicle is configured to provide lift for the system.

6. A system according to claim 1, wherein:
   the tether has a first end;
   the lighter-than-air vehicle comprises an attachment location for the first end of the tether; and the heavier-than-air vehicle is configured to fly in a path, relative to the lighter-than-air vehicle, defined by the attachment location and the tether.

7. A system according to claim 1, further comprising a consumable storage device coupled to the tether, the consumable storage device having an outlet configured to deliver a consumable to the heavier-than-air vehicle to extend mission endurance of the heavier-than-air vehicle.

8. A system according to claim 7, wherein the consumable storage device is configured to gravitationally deliver the consumable to the heavier-than-air vehicle.

9. A system according to claim 7, wherein the consumable storage device is configured to pressure feed the consumable to the heavier-than-air vehicle.

10. A system according to claim 1, wherein the heavier-than-air vehicle carries communications equipment.

11. A system according to claim 1, further comprising a remote control subsystem for the heavier-than-air vehicle.

12. A system according to claim 1, further comprising a data collection subsystem configured to receive data from the heavier-than-air vehicle.

13. A system according to claim 1, further comprising an energy collection subsystem for the heavier-than-air vehicle.

14. A system according to claim 1, further comprising an energy storage subsystem for the heavier-than-air vehicle.

15. A system according to claim 1, further comprising a mechanism for decoupling the heavier-than-air vehicle and the lighter-than-air vehicle.

16. An aircraft system comprising:
a heavier-than-air vehicle having a propulsion system and mission payload;
a lighter-than-air vehicle; and
a tether coupled between the heavier-than-air vehicle and the lighter-than-air vehicle, wherein the tether is attached to the heavier-than-air vehicle at a first coupling and is attached to the lighter-than-air vehicle at a second coupling, wherein wings of the heavier-than-air vehicle when attached to the lighter-than-air vehicle are substantially horizontal, wherein the heavier-than-air vehicle is suspended below the lighter-than-air vehicle with respect to a direction of gravity, wherein the lighter-than-air vehicle and the tether are configured to support the heavier-than-air vehicle while the heavier-than-air flies in a first flight path that is different than a second flight path of the lighter-than-air vehicle, and wherein the heavier-than-air vehicle remains supported by the lighter-than-air vehicle and functions as a unit with the lighter-than-air vehicle while using the mission payload.

17. An aircraft system according to claim 16 wherein a speed of the heavier-than-air vehicle is defined as Vp, wherein a first angle $\phi_1$ is defined between two lines drawn from the second coupling to opposite points on the circle, wherein a second angle, $\phi_2$, is defined between a vertical line defined from the second coupling along a direction of gravity and a radial line from a center of the circle to the second coupling, wherein a third angle, $\beta$, is a radial angle away from the lighter-than-air vehicle relative to the heavier-than-air vehicle, wherein $\beta$ is further defined by a first equation $$\beta = \frac{Vp}{P\sin(\phi_1 - \phi_2)}t,$$

wherein t is a time for the heavier-than-air vehicle to complete one rotation about the circle at speed Vp, and wherein the tether is coupled to the heavier-than-air vehicle and to the lighter-than-air vehicle such that $\phi_1$, $\phi_2$, and $\beta$ all vary when the heavier-than-air vehicle is moving relative to the lighter-than-air vehicle.

18. An aircraft system according to claim 16, wherein a speed of the heavier-than-air vehicle is defined as Vp, wherein a first angle $\phi_1$ is defined between two lines drawn from the second coupling to opposite points on the circle, wherein a second angle, $\phi_2$, is defined between a vertical line defined from the second coupling along a direction of gravity and a radial line from a center of the circle to the second coupling, wherein a third angle, $\beta$, is a radial angle away from the lighter-than-air vehicle relative to the heavier-than-air vehicle, wherein $\beta$ is further defined by a first equation $$\beta = \frac{Vp}{P\sin(\phi_1 - \phi_2)}t,$$

wherein t is a time for the heavier-than-air vehicle to complete one rotation about the circle at speed Vp, and wherein the tether is coupled to the heavier-than-air vehicle and to the lighter-than-air vehicle such that $\phi_1$, $\phi_2$, and $\beta$ all vary when the heavier-than-air vehicle is moving relative to the lighter-than-air vehicle.

19. A method comprising:
tethering a lighter-than-air vehicle to a heavier-than-air vehicle having a propulsion system, wherein the tether is attached to the heavier-than-air vehicle at a first coupling and is attached to the lighter-than-air coupling at a second coupling, wherein wings of the heavier-than-air vehicle, when attached to the lighter-than-air vehicle, are substantially horizontal, wherein the first coupling, the second coupling, and the tether allow the heavier-than-air vehicle to fly in a flight path relative to the lighter-than-air vehicle, and wherein the tether is configured such that the lighter-than-air vehicle can support the heavier-than-air vehicle while the heavier-than-air vehicle flies in motion relative to the lighter-than-air vehicle;
supporting, with the tether, the heavier-than-air vehicle from the lighter-than-air vehicle while the lighter-than-air vehicle and the heavier-than-air vehicle are in flight, wherein the heavier-than-air vehicle has a mission payload;
flying the heavier-than-air vehicle relative to the lighter-than-air vehicle such that at least one of a first angle and a second angle varies as a result of the heavier-than-air vehicle flying relative to the lighter-than-air vehicle, wherein the first angle is between a horizontal line and the tether, wherein the horizontal line is drawn from the second coupling and is perpendicular to a line representing a direction of gravity, wherein the second angle is between a vertical line and the tether, and wherein the vertical line is drawn from the second coupling along the direction of gravity; and
using the mission payload while the heavier-than-air vehicle remains supported by the lighter-than-air vehicle and functions as a unit with the lighter-than-air vehicle.

20. A system according to claim 1, wherein the mission payload is selected from a group consisting of using surveillance, reconnaissance, weather sensors, electronic warfare, and weapons.

21. A system according to claim 4, wherein the station-keeping propulsion during close requirements station-keeping is selected from a group consisting of straight into a wind in response to a high wind, circular in response to a low wind, and powering down in response to no wind.

22. A system according to claim 4, wherein the station-keeping propulsion during allowable movement station-keeping is straight into a wind in response to a high wind, powering on and off in intervals in response to a low wind, and powering down in response to no wind.

23. A method according to claim 19, wherein the mission payload is selected from a group consisting of using surveillance, reconnaissance, weather sensors, electronic warfare, and weapons.

* * * * *